(12) United States Patent
Kerschmann et al.

(10) Patent No.: US 6,195,451 B1
(45) Date of Patent: Feb. 27, 2001

(54) TRANSFORMATION OF DIGITAL IMAGES

(75) Inventors: Russell L. Kerschmann, Mill Valley; Andrew Hendrickson; Benn P. Herrera, both of San Francisco, all of CA (US)

(73) Assignee: Advanced Pathology Ststems, Inc., San Francisco, CA (US)

( * ) Notice: Subject to any disclaimer, the term of this patent is extended or adjusted under 35 U.S.C. 154(b) by 0 days.

(21) Appl. No.: 09/311,789

(22) Filed: May 13, 1999

(51) Int. Cl.[7] ........................................... G06K 9/00
(52) U.S. Cl. .................................................. 382/133
(58) Field of Search ................................ 382/128, 129, 382/130, 133

(56) References Cited

U.S. PATENT DOCUMENTS

| | | | |
|---|---|---|---|
| 4,202,037 | * 5/1980 | Glaser et al. | 345/354 |
| 4,794,460 | * 12/1988 | Shiota | 386/128 |
| 5,854,710 | * 12/1998 | Rao et al. | 359/559 |
| 5,986,271 | * 11/1999 | Lazarev et al. | 250/458.1 |

* cited by examiner

*Primary Examiner*—Andrew W. Johns
*Assistant Examiner*—Shervin Nakhjavan
(74) *Attorney, Agent, or Firm*—Clark & Elbing, LLP

(57) ABSTRACT

In general, the invention consists of a means for staining a sample with a fluorescent dye, a means for producing a darkfield image of the fluorescent stained sample, and a means of transforming an image of a sample stained with one or more darkfield dyes into an image stained with one or more brightfield dyes for examination on a computer monitor. The process includes applying a digital lookup table or other computational means in order to convert the darkfield data to brightfield forms, and a means of displaying said transformed information. Preferably, the imaging means is a block face microscope, and the means for transforming the images is a digital computer.

15 Claims, 1 Drawing Sheet

Microfiche Appendix Included
(1 Microfiche, 43 Pages)

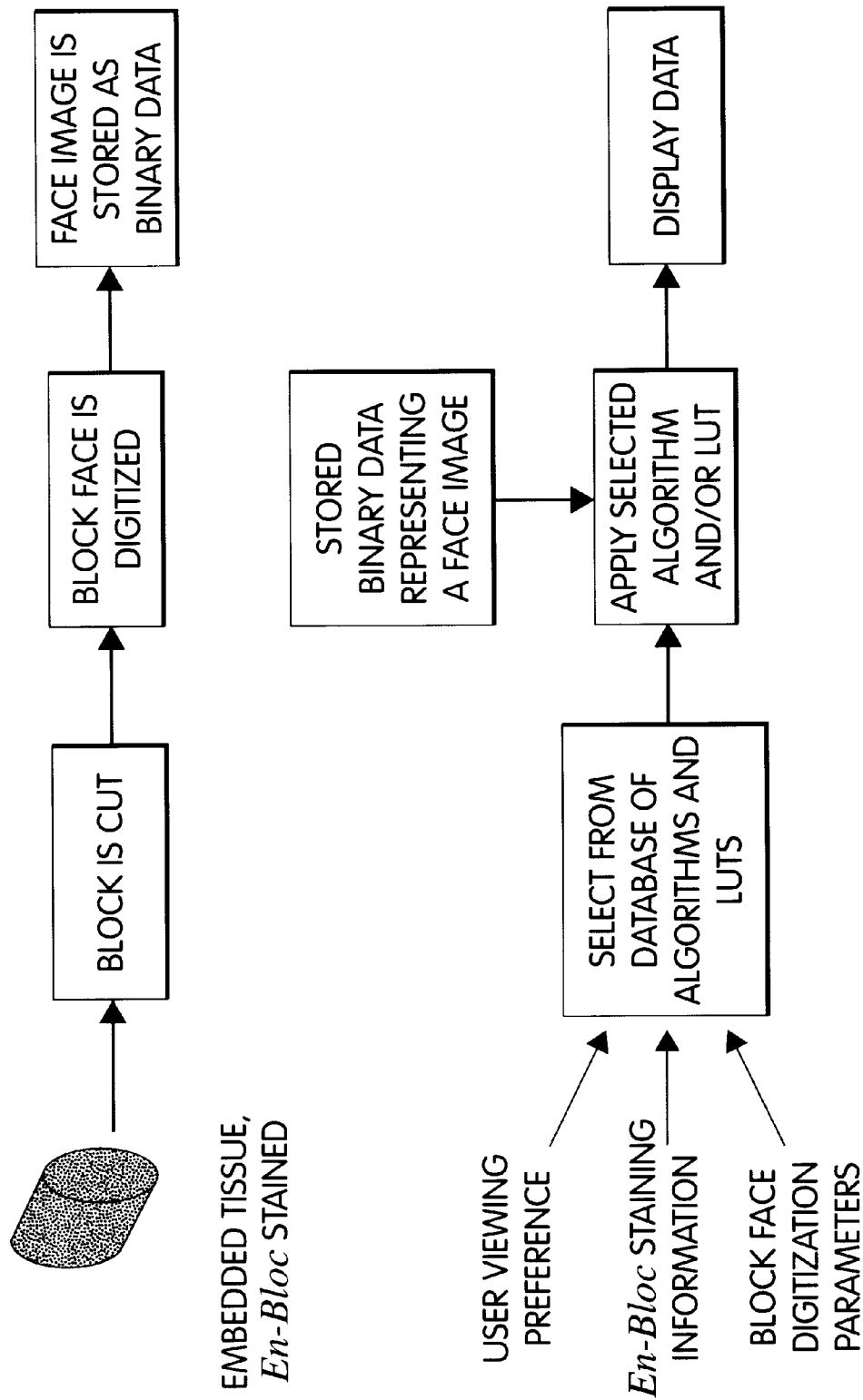

TRANSFORMATION OF DIGITAL IMAGES

BACKGROUND OF THE INVENTION

The invention relates to the field of histology.

In present day practice, the preparation of organic tissue samples and other material for transmission microscopy, both visible light and electron microscopy, is normally carried out by subjecting the sample to a series of chemical treatments culminating in the production of a solid block in which the sample is embedded. After the block is produced, thin sections of the sample (with the surrounding embedding material) are cut from the block and transferred to glass slides or other support. The embedding material may then be chemically removed and the tissue section stained with a variety of colored or fluorescent dyes, immunohistochemical stains, or subjected to in situ hybridization prior to examination.

In conventional histopathology, the most common brightfield stain applied to clinically important tissue sections is the hematoxylin and eosin (H&E) formulation. This method results in staining of nucleic acids and other so-called "basophilic" substances in the tissue section with a blue-purple coloration, and proteins and other "acidophilic" or "eosinophilic" tissue components with a pink coloration. This stain is used world-wide as a general screening method for the examination of all tissue components, to be followed in certain cases by special stains that have affinities for specific tissue elements such as microorganisms or nerve processes, and therefore enhance their appearance on stained tissue sections.

Methods have been introduced for en bloc staining, wherein the entire sample is stained by immersion before being subjected to infiltration and embedment. Sections are then cut from the block for transmission microscopy, or the cut face of the block itself is imaged in a process called block face microscopy or surface imaging microscopy. In the latter method, including that implemented in U.S. Pat. No. 4,960,330, a sample that has been stained en bloc with either conjugated or unconjugated fluorescent dyes is subsequently infiltrated by and embedded in a medium, commonly a plastic polymer, that is heavily opacified or otherwise treated to allow for the suppression of images of tissue originating from more than a small number of microns deep within the block. This results in the production of a thin, "virtual section" closely resembling a conventional glass-slide mounted tissue section.

Block face microscopy is advantageous over standard brightfield microscopy in that block face methods allow for the generation of high-quality microscopy images of biological tissue and other materials without the need to manufacture glass histology slides. The elimination of this requirement permits full automation of the histopathologic process, reducing incremental costs for each additional section produced, and consequently allowing for much greater amounts of information to be collected from each sample.

In block face microscopy, the digital virtual section as captured unmodified from the block face is a dark field image resulting from the colored emissions from the fluorescence-stained sample appearing against a black background representing the opacified polymer in which the sample is infiltrated and embedded. In contrast, conventional optical transmission microscopy, including that practiced in most surgical pathology laboratories and other medically-related microscopy-based diagnostic facilities, produces a brightfield image because thin slices of tissue and other material are stained with standard non-fluorescent dyes and are then trans-illuminated with a white or near-white light source, resulting in a background that is brighter, rather than darker than the tissue image.

In order to optimize block face microscopy images for clinical diagnosis and other purposes, it is preferable that the raw darkfield images captured from the face of the block be transformed and displayed as the more familiar images encountered in brightfield microscopy.

SUMMARY OF THE INVENTION

In general, the invention consists of a means for staining a sample with a fluorescent dye, a means for producing a darkfield image of this fluorescent stained sample, and a means of transforming the darkfield images into bright field images for examination on a computer monitor. The process includes applying a digital lookup table or other computational means in order to convert the darkfield data to brightfield forms, and a means of displaying the transformed information. Preferably, the imaging means is a block face microscope, and the means for transforming the images is a digital computer.

Accordingly, in a first aspect, the invention features an image production method that includes: (a) staining a sample with a fluorescent dye; (b) producing a first image of the resultant fluorescent-dyed sample; and (c) using a digital processor to convert the first image to a second image that mimics an image of the sample stained with a non-fluorescent dye.

In a preferred embodiment, the converting of the first image to the second image includes applying a lookup table to the first image. In preferred embodiments, the modifying includes inverting the lookup table, or adjusting the color ranges of either the first image or the second image to mimic the color ranges of the sample stained with a non-fluorescent dye.

The sample can be stained with one dye or with two or more dyes. A preferred sample is a biological sample.

The invention also features an image production method that includes: (a) staining a sample with a first and a second fluorescent dye; (b) producing a first image of the sample stained with the first dye and a second image of the sample stained with the second dye; and (c) using a digital processor to convert the first and second images to a third image that mimics an image of the sample stained with hematoxylin and eosin.

The invention features an image production method that includes: (a) staining a sample with a fluorescent dye; (b) producing a first image of the sample stained with the dye and a second image of the sample stained with the dye; and (c) using a digital processor to convert the first and second images to a third image that mimics an image of the sample stained with hematoxylin and eosin.

The invention also features an image production method that includes: (a) staining a sample with the plurality of fluorescent dyes; (b) producing a first image of one of the dyes in the sample; and (c) using a digital processor to convert the first image to a second image that mimics an image of the sample stained with one non-fluorescent dye.

In another aspect, the invention features an image production method that includes: (a) staining the sample with the plurality of fluorescent dyes; (b) producing a first image that mimics the sample stained with a subset of fluorescent dyes; and (c) using a digital processor to convert the first image to a second image that mimics an image of the sample stained with one or more non-fluorescenit dyes.

Preferably, the first and second images of the invention are produced using an apparatus that includes a block-face microscope. The dye used in the invention can include a metachromatic dye (e.g., acridine orange).

By "conjugated" dye is meant a dye that is bound to a molecule having specificity for tissue elements. Exemplary conjugated dyes include, without limitation, fluorescently-coupled antibodies and fluoresc dna probes.

By "unconjugated" dye is meant a dye that is inherently fluorescent.

By "infiltration" is meant treating the tissue with a liquid or series of liquids which penetrate throughout the tissue to the molecular level and are then transformed into a solid in order to render the sample rigid.

By "embedding" or "embedment" is meant positioning the infiltrated tissue in a mold and surrounding it with a substance (usually the same as the infiltrating substance) which is then hardened to form an encasing block. The embedding substance thus serves to provide rigid support and to facilitate the cutting process.

By "sectioning" is meant cutting from the block thin slices which may then be mounted on glass slides or other support.

By "staining" is meant treating a material with a colored or fluorescent substance that associates with the material on the molecular level.

"Fluorescence" or "darkfield" staining is accomplished using unconjugated dyes (i.e., dyes that are naturally fluorescent when excited with light of the proper wavelength) or conjugated dyes (i.e., molecules that bind to the sample and that are attached, either directly or indirectly, to a fluorochrome). Examples of conjugated dyes include without limitation: (i) a primary antibody that binds to an antigen and a secondary antibody, containing a fluorochrome, that binds to the primary antibody; and (ii) a molecule that has, covalently bound to it, a fluorochrome. Fluorescence staining results in images that have a black background, while "standard" or "brightfield" staining is accomplished using dyes that are usually non-fluorescent and results in images with a bright, or white background. It is understood that the same dye could be useful for both fluorescence and standard microscopy.

"Metachromatic" dyes constitute a subset of histochemical stains, many of which are fluorescent. Like most fluorochromes, these compounds absorb light of a specific wavelength and re-emit it at a longer wavelength or wavelengths. The spectral properties of metachromatic dyes are strongly influenced by their proximity to target molecules, such that their emission wavelength is altered. Thus, these dyes change colors when they combine with certain types of materials. In some cases, the metachromatic dye may emit light only when bound to its target, and is otherwise not visible. An exemplary metachromatic dye is acridine orange. Other metachromatic dyes are known to those skilled in the art and include, without limitation, those listed in Conn's Biological Stains, Williams & Wilkens 9th Ed. 1977 (hereby incorporated by reference), and those available from Molecular Probes, Inc. (Eugene, Oreg.). Most of the latter dyes are the subject of issued U.S. patents, all of which are hereby incorporated by reference. The Molecular Probes metachromatic dyes, which tend to label proteins, are catalogued as falling into the following three categories: bezoxadiazole derivatives, napthalene derivatives, and pyrene derivatives.

By this method, image data on biological tissue and other materials may be generated efficiently by means of block face microscopy, and displayed in the most useful and familiar form as bright field images.

Other features and advantages of the invention will be apparent from the following description of the preferred embodiments thereof, and from the claims.

BRIEF DESCRIPTION OF THE DRAWING

The figure shows diagramatical steps of a method of the invention.

DETAILED DESCRIPTION OF THE INVENTION

We have discovered a method for imaging a sample, such as a tissue sample, with one or more darkfield dyes and transforming the image to a second image that mimics an image of a sample stained with one or more brightfield dyes. The method of transforming a first image to a second image can involve applying a lookup table to the first image.

Lookup Tables

The transformation of a first image to a desired second image generally uses a collection of conversion values referred to as a lookup table. A lookup table consists of a list of color value relationships describing a one-to-one transform and may be generally computational according to certain criteria set by the user of the imaging system. Means for transforming digital images include general methods such as transfer functions that apply a mathematical formula to each data element. Examples include image color inversion transformations that may act by subtracting all data elements from some constant value.

Alternatively, each data element in the image may be altered according to some higher-order computed result based upon analyses of patterns or other features in the image. For example, the value of every data element in some region of interest within an image may be summated, and this total value used to determine the general color of the region as it is displayed. Methods involving such higher level computations to determine a stain simulation are referred to in the invention as "computed stains."

In general, a lookup table, such as an RGB (red, green, and blue) lookup table, is applied to each channel (e.g., the red channel, the green channel, etc.) of the darkfield image. In the course of converting the image from a darkfield image to a brightfield image, each source darkfield sample value (e.g., each pixel) is used as an index to reference the lookup table in order to ascertain the corresponding value for the brightfield image. The colors obtained for each channel are then combined to create the RGB brightfield image. Methods for color mapping and described, for example, in J. C. Russ (1995) *The image processing handbook*. 2nd edition CRC Press, Ann Arbor, Mich., hereby incorporated by reference.

Additive Colorspace Conversion

In one example, a table of RGB colors is created with one entry for each possible darkfield value. For example, if the source (i.e., the darkfield image) has a range from 0 to 255 (wherein 0 is black and 255 is white), a table of 256 entries is created. Each entry in the table is filled with a color that can be obtained as follows:

H=target color hue

S=target color saturation

B=target color brightness * I/max_sample_value (e.g., 8-bit=255)

where I is the index of the current lookup table value being calculated, and ranges from 0 to max_sample_ value (e.g., 255). The resulting HSB color is converted to RGB colorspace and is inserted into the lookup table at position I.

The result is that each lookup table entry is a brightness-scaled version of the target brightfield image color. The colors in the table span a range from black, ascending in brightness up to the last entry, which is the unmodified target image color.

For example, if the target color were primary red, then the lookup table would start at black, gradually increase from darker reds to brighter reds, to the last entry, which would be primary red.

For each set of source channels, the RGB colors obtained from the lookup table are added (e.g., red to red, green to green, blue to blue) to obtain one RGB color. The values are limited so that the max_sample_value (e.g., 255 for 8-bit) is not exceeded. A brightening value is then added to each RGB value. This value is obtained by taking the "darkness" of the original, darkfield image and converting it as follows:

max_sample_value—maximum(source channel 1, source channel 2, . . . )

The largest of the source sample values is subtracted from the max_sample_value to obtain a darkness level. The darkness level is added to each component of the new RGB color to brighten it by that amount. The result is that source sample values that were very dark become very bright.

Subtractive Colorspace Conversion

In a second method for converting a darkfield image to one resembling a brightfield image, a lookup table of RGB colors is created as described above, except that each entry in the table is filled with a color that can be obtained as follows:

H=target color hue

S=target color saturation * I/max_sample_value (e.g., 8-bit 255)

B=target color brightness

The resulting HSB color is converted to RGB colorspace and is inserted into the lookup table at position I.

The result is that each lookup table entry is a saturation-scaled version of the target brightfield image color. The colors in the table span a range from white, ascending in saturation up to the last entry, which is the unmodified target image color.

For example, if the target color were primaly red, the lookup table would start at white, increasing from lighter reds (pinks) to more saturated reds until the last entry, primary red.

Thus, using the foregoing method, each source channel is converted to an RGB color. These colors are blended as follows.

The RGB colors are converted to CMY (cyan, magenta, and yellow) colors. CMY is subtractive color space. The CMY colors are added (e.g., the cyan values from each source channel are added to produce a single cyan value, the magenta values from each source channel are added to produce a single magenta value, etc.). As described herein, it is desirable to restrict the values to the maximum allowed (i.e., the max_sample_value). Following summation, the resulting CMY color is reconverted to RGB colorspace.

In the case of the conversion of a darkfield image stained with acridine orange to a brightfield image stained with H&E, the increase is from black to the target color (in the case of additive colorspace) or white to the target color (in the case of subtractive colorspace) is linear. Those skilled in the art will recognize that other lookup tables, including non-linear or even discontinuous lookup tables, are also useful in the invention.

Staining with Darkfield Dyes

One method for computationally generating an image of a sample stained with a brightfield dye or combination of dyes (e.g., H&E) is to stain the sample with a mixture of fluorochrome stains that differentially bind to various tissue structures or, alternatively, with a single fluorescent stain that produces more than one color when applied to a sample (i.e., a metachromatic dye). The image conversion methods described herein allow for conversion of the darkfield image of a sample stained with one or more darkfield dyes to mimic an image of the sample stained with one or more brightfield dyes.

In one example, a sample containing fungal organisms is stained with a combination of fluorescent dyes, one of which displays higher affinity for the fungal organisms and another of which displays higher affinity for components of the tissues. A darkfield image of the sample stained with these dyes would reveal fungal organisms labeled with a distinctive color relative to the tissue. Upon conversion to a brightfield image (using standard methods such as those described herein), the differential color properties of the original image are transformed to a brightfield image of tissue containing fungal organisms.

In a second example, a darkfield image of a sample containing fungal organisms, which has been stained with a single, monochromatic dye, is transformed to yield a polychromatic brightfield image by assigning different brightfield colors to various grayscale intensity values in the original darkfield image. for example, if the fungal organisms display a greater affinity for the monochromatic dye than does the tissue, the difference in intensity can be used to yield one set of brightfield colors for the brightly stained sample (i.e., the fungal organisms) and a second set for the dimly stained sample (i.e., the tissue). Other distinctive properties, such as size, can also be used to computationally assign brightfield colors.

Encoding Multiple Stains in a Single Sample

A sample can be stained with multiple dyes, while only one or a subset of these dyes is imaged. At another time, the other dyes from the same sample can be imaged using different filter cubes or excitation methods. Thus, one sample can contain many more dyes than are imaged at one time.

Dyes that are imaged at the same time can be distinguished from each other using filter cubes that restrict the wavelengths of emitted light that reaches the detector. Alternatively, individual dyes can be distinguished using spectral analysis or other higher order analysis. Such methods for imaging tissue are described in Levenson, R. M. and Farkas, D. L. (1997) Proc. SPIE, 2983: 123–135; Levenson, R. M. and Young, D. A. (1991) In: M. J. Dunn (Editor), Proc. International Meeting on Two-Dimensional Electrophorcsis. Dept. of Cardiothoracic Surgery, National Heart and Lung Inst. (UK), London, UK; and Levenson, R. M., Brinckmann, U. G., Androphy, E., Schiller, J., Turek, L., Chin, M., Broker, T. R., Chow, L. T. and Young, D. A. (1987) In: B. M. Steinberg, J. L. Brandsma and L. B. Taichman (Editors), Cancer Cells V. Papillomaviruses. Cold Spring Harbor Press, New York, pp. 137–144, all of which are hereby incorporated by reference.

The following examples are to illustrate the invention. They are not meant to limit the invention in any way.

EXAMPLES

Example I. Single Dye Method for H&E

The metachromatic dye acridine orange is a fluorescent dye in which the color of the fluorescence produced upon staining tissue and other material is dependent on the chemical composition of the tissue element to which it is bound. For example, nucleic acids emit a yellow color upon staining with acridine orange, while cytoplasmic proteins simultaneously emit a green color when so stained. Thus, the color differentiation of tissue elements resulting from staining of tissue and other materials with acridine orange is similar to that seen with H&E, except that different specific colors are produced, and in addition, acridine orange, being a fluorescent stain, produces a darkfield, rather than a brightfield, image.

A specific algorithm for making display data that appears as a brightfield H&E stain from a fluorescent sample using initially stained using acridine orange and captured with a digital camera is as follows. The input image is digitized by the camera, yielding pixels which, are black or only have red and green values. The output pixels represent an RGB image that will appear as a brightfield image stained with Hematoxylin and Eosin.

Let:

Sr,Sg=the source pixel values for red and green

Dr, Dg, Db=the destination pixel values for red green and blue

Pmax=the maximum value of a pixel (i.e. 8-bit=$2^8$=256, 10-bit=$2^{10}$=1024, etc.)

Hr, Hg, Hb=the RGB indices of a Hematoxylin brightfield color

Er, Eg, Eb=the RGB indices of an Eosin brightfield color

Dr=Pmax−max(Sr, Sg)+(Sr/Pmax)*Hr+(Sg/Pmax)*Er

Dg=Pmax−max(Sr, Sg)+(Sr/Pmax)/Hg+(Sg/Pmax)*Eg

Db=Pmax−max(Sr, Sg)+(Sr/Pmax)/Hb+(Sg/Pmax)*Eb

The invention thus makes possible the conversion of images of acridine orange stained tissues into images resembling H&E stained tissues by means of applying a color lookup table or other means of color transformation to the images of acridine orange stained tissue.

Those skilled in the art of H&E staining will recognize that there is variability in the hue and saturation of tissue stained with each component due to variations in the production or storage of the staining solution. Thus, more than one look-up table can be used to convert a darkfield image of a sample stained with acridine orange to mimic a brightfield image stained with H&E. The accompanying microfiche lists computer code (in the computer language C) for a program that generates lookup tables for specified target-stained colors suitable for transforming a darkfield image of a sample stained with acridine orange to a brightfield image of the sample stained with H&E.

Example II. Multiple Dye Method for H&E

Fluorescent stain mixtures that differentially color basophilic and acidophilic substances in tissue may be substituted for acridine orange, and suitable lookup tables or other means created to transform the resulting darkfield images into those which resemble standard brightfield H&E images. One alternative formulation is a combination of propidium iodide (to stain nucleic acids) and eosin Y (to stain proteins). In one example, a biopsy of cancerous tissue is treated with propidium iodide, a yellow fluorescent stain that binds in a quantitative manner to nucleic acids, and is commonly used for the quantitation of DNA in flow cytometric studies of tumor cell nucleic acid content. The tissue is also stained with eosin Y to color green the non-nuclear components of the tissue. According to the invention, a darkfield image captured from this tissue sample is transformed into a brightfield image in which the background color appears white, the non-nuclear portion of the tissue appears pink, and the nuclei appear blue. Alternatively, the fluorescence intensity of each nucleus is quantitatively measured to approximate the DNA content of the nucleus, which quantity relates by a color lookup table or other means to the color to be applied to the brightfield image of each nucleus, such that each nucleus will display a different color according to the total amount of DNA contained therein, thus resulting in a "computed stain" that relates to DNA content.

Example III. Method for producing a polychr-omatic image from a monochromatic dye In a third example, by use of the invention, an image of a monochromatic stain is converted to a polychromatic image resembling an image of a sample stained with a polychromatic stain or multiple monochromatic stains. One example is the application of the blue-white stain Fluorescence Brightener 28 to tissue samples containing fungal organisms. Fluorescence Brightener 28 strongly binds to fungal bodies and makes them appear much more prominent than other structures in darkfield images, such as the cells of the infected organism. Hence, in an image with pixels representing 256 shades of gray (in which a pixel value of 0 is black, and a pixel value of 255 is white), the pixels representing the fungal bodies have high pixel values.

In one example, the fungal bodies have a pixel value greater than X, while the non-fungal structures each have a pixel value less than X. A color lookup table is created to transform the more brightly staining fungal bodies (i.e, all pixels greater than X) into a first brightfield color such as dark purple-grey; the remaining structures of the tissue (i.e., all pixels between X and 0) are transformed into a second brightfield color such as pale green. Similarly, the black background (i.e., all pixels with values of 0) is made to appear white, thus producing a brightfield appearance. This coloration combination results in an image closely resembling the Grocott methenamine-silver stain, which is commonly employed in surgical pathology laboratories to stain fungus in tissue sections.

Other Embodiments

While this invention has been particularly shown and described with references to preferred embodiments thereof, it will be understood by those skilled in the art that various changes in form and details may be made therein without departing from the spirit and scope of the invention as defined by the appended claims. Those skilled in the art will recognize or be able to ascertain using no more than routine experimentation, many equivalents to the specific embodiments of the invention described specifically herein. Such equivalents are intended to be encompassed in the scope of the claims.

What is claimed is:

1. An image production method comprising:

a) staining a sample with a fluorescent dye;

b) producing a first image of the resultant fluorescent-dyed sample; and c) using a digital processor to convert said first image to a second image that mimics an image of said sample stained with a non-fluorescent dye.

2. The method of claim 1, wherein said first image is produced using a block-face microscope.

3. The method of claim 1, wherein said converting of said first image to said second image comprises applying a lookup table to said first image.

4. The method of claim 1, wherein said sample is stained with at least two fluorescent dyes.

5. The method of claim 1, wherein said sample is a biological sample.

6. An image production method comprising:
   a) staining a sample with a first and a second fluorescent dye;
   b) producing a first image of said sample stained with said first dye and a second image of said sample stained with said second dye; and
   c) using a digital processor to convert said first and second images to a third image that mimics an image of said sample stained with hematoxylin and eosin.

7. The method of claim 6, wherein said first and second images are produced using a block-face microscope.

8. An image production method comprising:
   a) staining a sample with a fluorescent dye;
   b) producing a first image of said sample stained with said dye and a second image of said sample stained with said dye; and
   c) using a digital processor to convert said first and second images to a third image that mimics an image of said sample stained with hematoxylin and eosin.

9. The method of claim 8, wherein said first and second images are produced using a block-face microscope.

10. The method of claim 8, wherein said dye comprises a metachromatic dye.

11. The method of claim 10, wherein said metachromatic dye comprises acridine orange.

12. An image production method comprising:
   a) staining a sample with said plurality of fluorescent dyes;
   b) producing a first image of one of said dyes in said sample; and
   c) using a digital processor to convert said first image to a second image that mimics an image of said sample stained with one non-fluorescent dye.

13. The method of claim 12, wherein said first image is produced using a block-face microscope.

14. An image production method comprising:
   a) staining said sample with said plurality of fluorescent dyes having overlapping excitation and emission spectra;
   b) producing a first image that mimics said sample stained with a subset of said plurality of fluorescent dyes; and
   c) using a digital processor to convert said first image to a second image that mimics an image of said sample stained with at least one non-fluorescent dye.

15. The method of claim 14, wherein said first image is produced using a block-face microscope.

* * * * *

UNITED STATES PATENT AND TRADEMARK OFFICE
CERTIFICATE OF CORRECTION

PATENT NO. : 6,195,451 B1
DATED : February 27, 2001
INVENTOR(S) : Russell L. Kerschmann, Andrew Hendrickson, Benn P. Herrera It is certified that error appears in the above-identified patent and that said Letters Patent is hereby corrected as shown below:

Column 1,
Line 24, replace "cosinophilic" with -- eosinophilic --;

Column 2,
Line 47, replace "cosin" with -- eosin --;
Line 54, replace "cosin" with -- eosin --;
Line 67, replace "non-fluorescenit" with -- non-fluorescent --;

Column 5,
Line 44, replace "primaly" with -- primary --;

Column 6,
Line 52, replace "electrophorcsis" with -- electrophoresis --;

Column 7,
Line 25, replace "2ô8" with -- 2^8 --;
Line 26, replace "2ô10" with 2^10 --;
Line 64, replace "cosin" with -- eosin --;

Column 8,
Line 10, replace "polychr-omatic" with -- polychromatic --; and
Line 5b, replace "fluorescent" with -- fluorescent --.

Signed and Sealed this

Twelfth Day of March, 2002

Attest:

*Attesting Officer*

JAMES E. ROGAN
*Director of the United States Patent and Trademark Office*